March 16, 1954     B. E. ROETHELI     2,672,490
CATALYTIC DECOMPOSITION OF HYDROCARBONS
Filed March 15, 1949
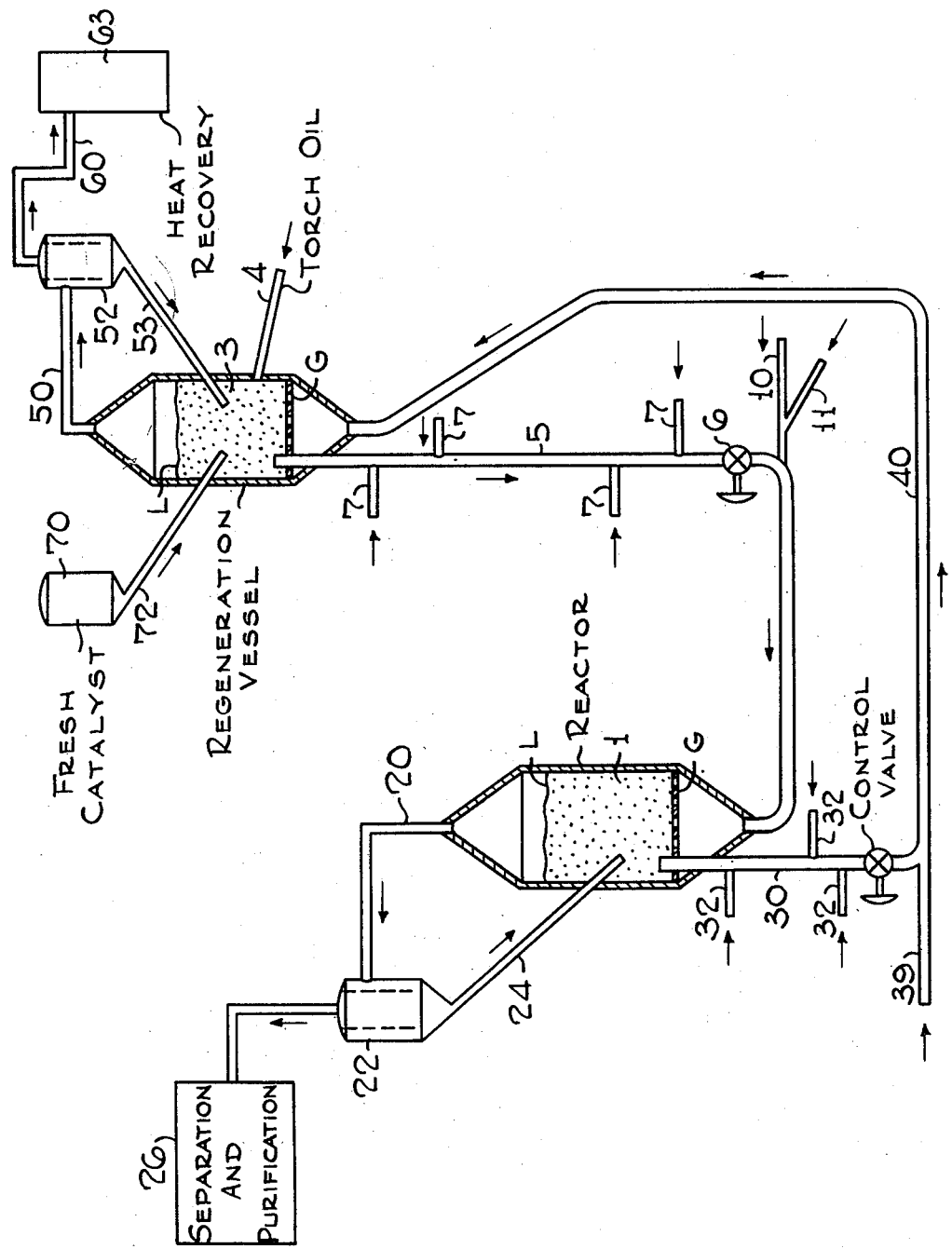
Bruno E. Roetheli Inventor
By Henry Berk Attorney Patented Mar. 16, 1954

2,672,490

UNITED STATES PATENT OFFICE 2,672,490

CATALYTIC DECOMPOSITION OF HYDROCARBONS

Bruno E. Roetheli, Putney, England, assignor to Standard Oil Development Company, a corporation of Delaware Application March 15, 1949, Serial No. 81,598

3 Claims. (Cl. 260—683.3)

The present invention relates to the novel features hereinafter fully disclosed in the specification and claims. It pertains to normally endothermic selective decomposition reactions of hydrocarbons that employ a fluidized solid catalyst in an adiabatically heated reaction zone, for which such features of control are important.

This application is a continuation-in-part of application, Serial Number 555,456, filed September 23, 1944, and now abandoned.

The commercial selective decomposition process which involves a dehydrogenation of hydrocarbons, e. g. dehydrogenation of paraffins to produce desired olefins or diolefins such as butenes or butadiene, or dehydrogenation and rearrangement without cracking are now a matter of record and common practice. In the less modern commercial units built for dehydrogenation, the operation has been of the stationary bed type, that is to say, the catalyst is contained in a reaction vessel or case in the form of pills, pellets, extruded lengths, shaped bodies, granules, and the like, and the mass of catalytic material is disposed in the form of stationary beds. Of course, this type operation with a fixed catalyst gives difficulty in achieving uniform reaction conditions, is necessarily intermittent with respect to a given case or reaction vessel, for variations arise as to points of contact and catalyst activity and there comes a time when it is necessary to reactivate the entire catalyst to remove carbonaceous deposits contained thereon as a result of the process.

More recently there has been work directed toward the end of producing olefins by dehydrogenation in a continuous operation. The processes involved have used a powdered catalyst suspended in the reaction vapors in the reaction zone in the form of a dense phase suspension. This type of operation in which a "delayed settler" is employed has come to be known as the fluid catalyst type of operation. With respect to the catalytic cracking of hydrocarbon oils, there has been put into commercial operation the fluid catalyst type of operation, and in a preferred embodiment of this process a standpipe in communication with an elevated regeneration vessel feeds continuously by gravity and/or natural flow, a quantity of powdered catalyst to a reaction zone disposed below the level of the regeneration zone in which reaction zone, by controlling the amount of catalyst fed thereto and the velocity of the vapors and/or gases flowing therethrough, there is caused to be formed the fluidized mass of dense suspension previously referred to.

Although the use of a fluidized solid catalyst makes a remarkable improvement with regard to uniformity of catalyst activity, elimination of intermittent reactivation, and distribution of heat within the reaction zone, there are certain problems of temperature and contact time control that have become more accentuated in this type of process especially when the heat of reaction is substantial and when the reaction must be closely controlled to obtain high selectivity towards formation of certain products.

In a preferred embodiment of the present invention, a system is used in which catalyst in powdered form is continuously discharged from an elevated regenerator through a standpipe into a reactor disposed at a lower point, a hydrocarbon, to be selectively dehydrogenated, usually a gasiform paraffin or olefin, being also forced into said reactor, the flow rate of the gasiform paraffin or olefin being such that a dense suspension of catalyst in the gaseous reactant is formed in the reactor. Catalyst of partly spent activity is withdrawn from the reactor continuously and conveyed in a carrier gas stream to the regenerator. The catalyst is regenerated with an oxidizing gas in the regenerator and a stream of the regenerated catalyst is returned to the reactor thus completing a cycle of operations adapted for continuity.

The main object of the invention, is to supply heat chemically, or by exothermic reaction, in the reactor zone of a continuous dehydrogenation operation of the type outlined above in such a way so as to have exothermic heat substantially balance the endothermic heat absorbed by the reaction of the hydrocarbon reactant.

Another important object is to control the adiabatic heat input in the fluidized catalyst type of process, e. g. by having a proper temperature in the hydrocarbon feed in obtaining the desired heat balance.

While it is known that fluidized catalyst processes have been designed for adding sensible heat to a reaction zone by heating the catalyst in a zone outside the reaction zone, as for instance, by causing combustion of contaminants on fouled catalyst, burning added oil on the catalyst, etc., and thereafter transferring the uncooled catalyst to the reaction zone, there has apparently been no regard hitherto for the proper temperature control of the hydrocarbon feed and proportioning of the recycled catalyst to the feed for attaining the objects set forth herein.

In fundamental experimental work on which this invention is based, it was observed that during a fluidized catalytic dehydrogenation of paraffins or olefins, which are of course endothermic or heat absorbing, carbon oxides and water vapor appear in the products issuing from the dehydrogenation zone. In such dehydrogenation operations, the catalyst, or at least an active component thereof, is usually a partially reducible metallic oxide, such as molybdenum oxide, chromic oxide, tungstic oxide, or similar oxide of a heavy metal which can exist in more than one state of oxidation and is difficult to reduce to the elementary metal while the partially reducible metallic oxides might oxidize hydrogen, carbon, or hydrocarbons in the reaction zone to liberate heat, they also absorb heat in being reduced. At the same time other possible causes of heat changes exist, such as heat of absorption and desorption, hence it is difficult to determine theoretically what net heat change occurs. However, by actual experimental determinations the net heat changes can be measured and the factors ascertained. Thus means are provided during the course of the dehydrogenation reaction for providing in situ a quantity of chemical heat which shall be available to compensate at least in part for the heat absorbed by the endothermic reaction therein taking place. The advantage of my process lies in substituting chemical heat for sensible heat which tends to minimize the probability of local overheating when mixing hot catalyst from the regenerator with the feed stock and for obtaining an adiabatic operation which becomes more closely isothermal.

In the accompanying drawing is shown diagrammatically by means of a simplified flow plan the essential apparatus which illustrates a preferred embodiment of my invention.

Referring in detail to the drawing, 1 represents a reaction vessel or case, and 3 represents a regeneration vessel, or case, provided with a torch oil inlet 4. These vessels are cylindrical shells having conical or frusto-conical bases and crowns, and the regenerator is positioned above the reactor so that, as will appear more fully hereinafter, a natural flow of powdered catalyst from the regenerator to the reactor through a standpipe 5 may be effected. Assuming that the process to be operated involves the dehydrogenation of normal butane, in operating this process group VI metal oxide supported on activated alumina may be used for instance, say, 10–40 weight per cent of $Cr_2O_3$ carried on or supported by 90–60 weight per cent activated alumina. The catalyst is in the form of a powder having a particle size of from 100 to 400 mesh, but preferably 95 per cent of it is about 200 mesh.

Referring to the regenerator 3 which contains powdered catalyst undergoing regeneration, a portion of this catalyst is continuously withdrawn through standpipe 5 controlled by a slide valve 6. For purposes of purging the catalyst of occluded oxygen and, at the same time, inducing a free flow without bridging or plugging, a fluidizing gas is bled into the standpipe 5 through a plurality of taps 7 such as flue gas, $CO_2$, methane, or other inert gas. This fluidizing gas sweeps out entrapped or occluded oxygen and also, as indicated, fluidizes the catalyst so that it flows freely. At a point near the bottom of the standpipe 5 the butane feed is injected through line 10. Additional fluidizing gas, steam, or the like may be injected through line 11. The butane gas mixes with the catalyst forming a suspension which is discharged into the base of reaction vessel 1 and thence passes upwardly through a distributing grid G into the reaction zone proper. In the reaction vessel 1 the velocity of the gasiform material is controlled within the limits of from ½ to 5 ft. per second, preferably 1 to 3 ft. per second, to obtain the dense suspension previously referred to. The dense suspension of "fluidized" mass of catalyst in the gasiform material is obtained under the condition referred to by a sort of delayed settling wherein the velocity of the gas is sufficient to support the catalyst, but nevertheless permits a slippage so that the vapors pass through the mass of catalyst and into a space in the crown of the reaction vessel where they are greatly depleted of catalyst. In other words, by controlling the amount of catalyst discharged into reaction vessel 1 and the vapor gas velocity therein, upper level L of the dense phase of the suspension is fixed at a given point and the gases and/or vapors above the given point are greatly depleted of catalyst, or behold a small proportion of the catalyst in dilute suspension. Thus, for example, where the density of the suspension in the reaction zone between G and L may be of the order of 15–35 lbs. per cu. ft. the gasiform material actually issuing through line 20 from the reaction zone may have a density as low as 0.03 lb. per cu. ft.

The usual dehydrogenation conditions are maintained in the reaction zone. Thus the temperature is of the order of 925–1050° F., the pressure around 0–10 lbs. per square inch gauge, and the feed rate of hydrocarbon is such that there are from ¼ to 2 pounds of hydrocarbon feed per hour per pound of catalyst in the reaction zone per hour, but preferably around 0.3–0.7 pound of hydrocarbon is fed per hour per pound of catalyst in the reactor. These operating conditions as to temperature, pressure and feed rate were known prior to this present invention, and no novelty is claimed in them per se, nor is novelty claimed in the separation and recovery of the desired product, which in the illustration chosen is butylene. It will therefore be sufficient to say that the raw reaction products in line 20 are passed through one or more solid-gas contacting devices, such as centrifugal or electrical separators designed to remove catalyst fines from the raw product, which separated catalyst is then returned to the reaction zone via line 24, while the crude butylene passes into a purification system where, according to the usual practice, it is separated from gases and unconverted paraffins by suitable fractionation and absorption. In some cases the overhead products can be used directly without purification. The advisability of this depends upon economics.

Referring again to the reaction zone, catalyst which becomes fouled during the dehydrogenation or hydroforming operation is withdrawn through a standpipe 30 provided with a plurality of gas taps 32 into which purging gas such as flue gas may be injected into the standpipe 30 for the purpose of displacing occluded volatile hydrocarbons and at the same time increasing the fluidity of the downflowing fouled catalyst by preventing bridging and plugging therein. The catalyst discharged into a line 40 containing an oxygen-containing gas, such as air, introduced into line 39 to form a suspension which is pneumatically conveyed to the regenerator 3. In the regenerator the usual conditions of temperature and pressure are maintained to cause combustion of the carbonaceous deposits in the fouled catalyst. Thus the temperature is controlled within the limits of, say, 1050 to 1200° F.

and under atmospheric or super-atmospheric pressure so as to effect the desired purification of the catalyst by burning of the contaminants. Also, as in the case of the reaction vessel 1, the quantity of catalyst fed to the regenerator and the velocity of the gasiform material in the regenerator is controlled so as to maintain within the regenerator by a process which amounts to delayed settling of a suspension, a dense suspension of catalyst in gas, having an upper level at L and being concentrated to the extent that between the grid G and the level L, the mass of catalyst has a density of 15–40 lbs. per cubic foot depending on the composition of the catalyst. Above L the concentration of catalyst is greatly diminished so that the flue gases issuing through line 50 have a density of the order of 0.03 lb. per cubic foot. To remove at least a portion of the catalyst fines, the flue gas is caused to flow through a gas-solid contacting device 52 (or several of them) to effect separation of catalyst from the flue gas, which catalyst is returned via line 53 to the regeneration zone, while the flue gas is then passed through a heat recovery system 63 to recover at least a portion of its sensible heat. For simplicity sake, and also because many good methods are known to the prior art, I have not shown in detail the conventional waste heat boilers, heat exchangers, and the like, which may be employed to recover sensible heat from the hot flue gases, for the skilled engineer need not have this explained to him. Following regeneration, catalyst is returned through standpipe 5 to the reactor and the process is repeated. Unavoidably, of course, some catalyst may be lost from the system and therefore in order to maintain the catalyst inventory in the system at a constant value, and also to maintain the activity of the catalyst at a desired level fresh catalyst in hopper 70 may be fed either intermittently or continuously to the system through line 72.

In a general way a process illustrating a process to which a modification of the present invention can be applied now will be described in detail to show how to accomplish the objects aforementioned, namely, the adjustments of hydrocarbon feed temperatures and catalyst to hydrocarbon feed ratios to obtain better temperature and heat control. In the first place, of course, the burning of the contaminants on the catalyst in regeneration zone 3 provides as sensible heat a portion of the necessary heat for the main reaction taking place in reaction zone 1, to supplement this quantity of heat commonly the hydrocarbon feed has been heated to an elevated temperature within the reaction temperature range or close thereto for supplying the endothermic reaction heat requirements.

In the course of operating a continuous dehydrogenation plant according to the previous description, catalyst containing partially reducible oxides tend to become oxidized in the regeneration step to a higher state of oxidation and tend to become reduced to lower oxides in the reaction step. Reduction under certain conditions and with certain reducing agents is accomplished with a rise in temperature of the total system (catalyst-reactant). Metals of group VI form higher oxides in the regeneration step (oxidation) which in the presence of hydrocarbons are reduced to lower oxides with the formation of CO, $CO_2$ and $H_2O$ and a liberation of heat, i. e. the oxides furnish oxygen for formation of combustion products.

Intensive studies made of the reactions and regeneration using the type of catalyst described, which can be characterized as generally composed of a partially reducible oxide of a hexavalent metal and a stable metal oxide, such as alumina, magnesia, or the like. The stable metal oxides are difficult to reduce to any lower state of oxidation. Regeneration of such catalyst was found to be rapid and complete, the carbon in the carbonaceous or coke deposits being lowered by about 90% on contacting the spent catalyst with oxygen for about 1 second. Analyses showed that a portion of the oxygen oxidizes the catalyst.

From the results of heat balance measurements there was found to be a heating effect by the regenerated catalyst in the reaction and this effect could not be accounted for simply by oxidation of hydrogen and carbon.

Two different sets of heats of reaction were determined from a large series of runs. The first set was an evaluation of the overall heats of reaction, which take into account the total heat input and heat loss, so that these values include the heat evolved and absorbed by all reactions occurring. Such overall heats of reaction were found to vary from about −770 to +790 (endothermic to exothermic) B. t. u. per pound of feed converted. The second set of values were obtained by subtracting the heats of combustion of the carbon and hydrogen and should represent the net heat of dehydrogenation of the feed. Except for effects of variations in selectivity, the net heats of dehydrogenation should approximate the theoretical value, which is about 900 B. t. u. per pound of butane converted. However, there were found to be wide variations in the net heat of reaction values, ranging from about −1000 to +80 B. t. u. per pound of feed converted. In general, the two values, overall and net, for each run agree indicating that the factors causing the variations are conditions of operation and that, the variations were not due to haphazard inaccuracies.

The data indicate that one factor having a certain effect is the catalyst-to-hydrocarbon feed ratio. The effect of this factor is shown by the representive results tabulated below.

Table I

| Catalyst to Butane Feed Ratio | 6.1 | 6.2 | 7.2 | 7.8 | 7.8 | | | |
|---|---|---|---|---|---|---|---|---|
| Overall Heat of Reaction | −510 | −530 | −440 | −440 | −500 | | | |
| Net Heat of Reaction | −1,010 | −870 | −900 | −970 | −1,005 | | | |
| Catalyst to Butane Feed Ratio | 8.0 | 9.6 | 9.9 | 12.9 | 13.1 | 17.4 | 18.0 | 19.0 |
| Overall Heat of Reaction | *−250 | −65 | −130 | +420 | +510 | +490 | +590 | +790 |
| Net Heat of Reaction | *−750 | −620 | −655 | −485 | −265 | +60 | +80 | −145 |

*Interpolated Value.

The Table I data shows that when the catalyst to butane ratio is less than 8 parts by weight of catalyst to 1 part by weight of butane, the net heat of dehydrogenation is practically constant and approximates the theoretical heat of dehydrogenation, 900 B. t. u. per lb. of butane converted. When the ratio is increased to above 8:1, the net heat values are abruptly changed toward + (exothermic) values which when plotted show a definite linear relationship to reach a peak in the region where the ratio is in the range of 16:1 to 18:1. At the ratio of about 19:1 the net heat of reaction abruptly falls.

Thus it was indicated that by having the catalyst to hydrocarbon ratio within the range of 8:1 to 21:1 the net heat of dehydrogenation is substantially counterbalanced by exothermic heats of reaction, so that less heat might be supplied to the butane feed in preheating the feed stream in a heated tube prior to its contact with the catalyst to lessen difficulties from thermal decomposition and avoid excessive reaction when the hydrocarbon first contacts the freshly reactivated catalyst, which is also at its highest temperature.

Actually it was determined from a series of runs that a second important factor in obtaining a smoother operation, more even reaction temperature control with substantial heat input economy resides in the temperature of the preheated hydrocarbon feed as shown in representative data tabulated below:

Table II.—Butane dehydrogenation

[Chromia-alumina catalyst to butane ratios between 8:1 and 21:1.]

| Temperatures °F.: | | | | | | |
|---|---|---|---|---|---|---|
| Regenerated Catalyst | 1,102 | 1,110 | 1,138 | 1,080 | 1,124 | 1,120 |
| Hydrocarbon feed at inlet | 98 | 278 | 400 | 525 | 934 | 935 |
| Reactor Inlet | 1,038 | 1,022 | 1,098 | 1,030 | 1,072 | 1,080 |
| Reactor Top | 1,005 | 1,000 | 1,041 | 1,005 | 992 | 990 |
| Reactor Average | 1,002 | 1,000 | 1,044 | 1,003 | 997 | 998 |
| Overall Heat of Reaction, B. t. u./Lb. Feed Converted | +790 | +490 | +290 | +590 | −770 | −630 |

As illustrated by the data shown in Table II, in general it was found that by keeping the temperature of the hydrocarbon feed low, the deviations in temperature throughout the reaction zone is greatly diminished and a required reaction temperature is readily maintained. From such data it was determined it is advantageous to avoid preheating the hydrocarbon feed to above 700° F.

The following examples show the effect of the catalyst to hydrocarbon feed weight ratios at approximately minimum and maximum critical limits from average runs on the heat evolved to compensate for the heat losses (to outlet streams and from reaction apparatus by conduction and radiation) and for heat absorbed by the endothermic reaction.

Table III

Catalyst composition: 10% Cr$_2$O$_3$ on 90% Al$_2$O$_3$
Hydrocarbon feed: Field butane
Conversion: 30+Percent. Contact time: 20+seconds

| Catalyst Hydrocarbon Wt. Ratio | 9 (±0.5) | 20 (±1) |
|---|---|---|
| Hydrocarbon Feed: | | |
| Temperature, °F | 400 | 400 |
| Rate, lbs./min | 11 | 8 |
| Regenerated Catalyst Feed: | | |
| Temperature, °F | 1,110 (±20) | 1,110 (±20) |
| Rate, lbs | 99 | 160 |
| Reaction Zone: | | |
| Max. Temp., °F | 1,042 | 1,030 |
| Min. Temp., °F | 1,001 | 1,003 |
| Heat Losses, B. t. u./min | −700 | −835 |
| Heat of Reaction, Overall B. t. u./min | *+1,325 | *+980 |

*Positive value means overall heat of reaction is exothermic.

It can best be appreciated from the data in Table III how by operating within the preferred limits in which the catalyst to hydrocarbon ratio is within the range of 8 to 21, the reaction zone can be maintained at a relatively uniform temperature without preheating the feed to above 700° F., thus preventing thermal cracking in any preheating of the feed and preventing excessive reaction of the fresh feed with the highly active freshly regenerated catalyst. The average saving in thus preventing cracking of the hydrocarbon reactant to lower hydrocarbons amounts to about 9%.

By having the relatively low temperature hydrocarbon feed stream contact the freshly regenerated catalyst at a high temperature, before the resulting mixture is introduced into the reaction zone, the hydrocarbon reactant stream precools the catalyst without being immediately subjected to excessive reaction. The resulting reaction mixture then at a temperature within the optimum reaction temperature enters the reaction zone and this is a contributing factor in preventing an excessive temperature variation in the reaction zone. For the same reason, it is desirable to avoid having the regenerated catalyst at an unduly high temperature, even though this prevents addition of large amounts of heat on the feed streams to compensate for heat losses and to supply heat absorbed in the endothermic reaction. By the controls of the present invention, the exothermic heat evolved in excess of the heat needed in the endothermic reaction can in part at least compensate for these heat losses.

It is to be understood that the improvements of contacting a hydrocarbon reactant which is to be catalytically dehydrogenated without thermal cracking is applicable to paraffins, mono-olefins and naphthenes having 4 to 16 carbon atoms per molecule, since such hydrocarbons tend to undergo thermal cracking readily on being preheated at temperatures close to their catalytic dehydrogenation temperatures, which are generally in the range of about 800° F. to 1100° F. Thus, in general these improvements are adapted for use in conducting endothermic catalytic dehydrogenation and reforming reactions of naphtha hydrocarbons to form unsaturated and aromatic hydrocarbons.

Other modifications of this invention are readily suggested to those skilled in the art wherein an oxidized catalyst in fluidized form from a regenerator is contacted with a hydrocarbon reactant stream.

What is claimed is:

1. In a continuous process of dehydrogenating a vaporized butane with a hot fluidized catalyst that contains chromium oxide in its highest state of oxidation on alumina, the steps which comprise mixing a feed stream of the vaporized butane at a temperature between 100° F. and 700° F. with a stream of said hot fluidized catalyst at a temperature below 1200° F. but above the reaction temperature range of 1000–1050° F. to form a reaction mixture of between 8 and 12 parts by weight of said catalyst suspended in one part by weight of the vaporized butane, substantially all the catalyst thus admixed having been freshly regenerated by oxidation at 1050° F. to 1200° F. continuously passing said reaction mixture into a reaction zone wherein the catalyst forms a dense fluidized bed, continuously withdrawing gaseous reaction products and spent catalyst from said reaction zone while thus keeping the temperatures throughout the reaction zone from varying by more than about 50 Fahrenheit degrees.

2. In a continuous process of dehydrogenating a vaporized C$_4$ to C$_{16}$ hydrocarbon reactant of the group consisting of paraffins, mono-olefins, and naphthenes with a hot fluidized catalyst of chromic oxide on alumina, the steps which comprise mixing a feed stream of the hydrocarbon reactant in vapor phase at a temperature substantially below a dehydrogenation temperature of 925° F. with a stream of said catalyst substantially all freshly regenerated by oxidation and having its regeneration temperature in the range of 1050° F. to 1200° F., continuously admixing between 8 and 21 parts by weight of said freshly regenerated catalyst per one part by weight of the vaporized hydrocarbon reactant as the resulting mixture of the catalyst with the reactant feed stream is introduced into a reaction zone in order to counterbalance endothermic heat of the dehydrogenation reaction by a sufficient quantity of exothermic heat liberated in the reaction zone to thereby maintain a more uniform temperature varying by less than 50° F. within the limits of 925° F. and 1050° F. throughout the reaction zone, withdrawing from the reaction zone a stream of the resulting dehydrogenated hydrocarbon product, and continuously passing the catalyst used in the reaction zone to a regeneration zone for oxidation at 1050° to 1200° F.

3. In a continuous process of dehydrogenating a vaporized $C_4$ to $C_{16}$ paraffin hydrocarbon reactant with a hot fluidized catalyst of chromic oxide on alumina, the steps which comprise admixing said catalyst at a temperature in the range of 1050° F. to 1200° F. with a stream of the vaporized hydrocarbon reactant having a temperature in the range of 100° F. to 700° F. to form a continuous reaction mixture stream having a temperature in the range of 1000° F. to 1050° F., substantially all of said admixed catalyst having been freshly regenerated by oxidation at 1050° F. to 1200° F., passing said reaction mixture stream into a reaction zone which loses heat carried away by gaseous products and spent catalyst continuously withdrawn therefrom, by conduction, radiation and endothermic dehydrogenation of the paraffin hydrocarbon reactant, generating exothermic heat within the reaction zone at substantially the same rate which the reaction zone loses heat to keep temperatures throughout the reaction zone within the range of 1000° F. to 1050° F. by having substantially from 9.6 to 19 parts by weight of the hot catalyst mixed continuously with each one part by weight of the hydrocarbon reactant entering said reaction zone, withdrawing gaseous products from the reaction zone, and continuously passing the catalyst from the reaction zone to a regeneration zone where the catalyst is reoxidized at 1050° F. to 1200° F.

BRUNO E. ROETHELI.

References Cited in the file of this patent

UNITED STATES PATENTS

| Number | Name | Date |
| --- | --- | --- |
| 2,231,231 | Subkow | Feb. 11, 1941 |
| 2,327,175 | Conn | Aug. 17, 1943 |
| 2,392,248 | Layng et al. | Jan. 1, 1946 |
| 2,397,352 | Hemminger | Mar. 26, 1946 |
| 2,403,375 | Kassel | July 2, 1946 |